(12) United States Patent
Nagao et al.

(10) Patent No.: US 9,376,987 B2
(45) Date of Patent: Jun. 28, 2016

(54) THRUSTER AND SPACECRAFT

(71) Applicant: IHI AEROSPACE CO., LTD., Tokyo (JP)

(72) Inventors: Toru Nagao, Tokyo (JP); Naoki Morita, Tokyo (JP)

(73) Assignee: IHI AEROSPACE CO., LTD., Tokyo (JP)

(*) Notice: Subject to any disclaimer, the term of this patent is extended or adjusted under 35 U.S.C. 154(b) by 505 days.

(21) Appl. No.: 13/834,493

(22) Filed: Mar. 15, 2013

(65) Prior Publication Data
US 2013/0305687 A1 Nov. 21, 2013

(30) Foreign Application Priority Data

May 17, 2012 (JP) .................................. 2012-113428

(51) Int. Cl.
*F02K 9/00* (2006.01)
*F02K 9/34* (2006.01)
(Continued)

(52) U.S. Cl.
CPC ... *F02K 9/00* (2013.01); *B64G 1/22* (2013.01); *B64G 1/24* (2013.01); *B64G 1/26* (2013.01); *B64G 1/40* (2013.01); *B64G 1/401* (2013.01); *B64G 1/405* (2013.01); *B64G 1/406* (2013.01); *F02K 9/34* (2013.01); *F02K 9/343* (2013.01); *F02K 9/52* (2013.01); *F02K 9/60* (2013.01);
(Continued)

(58) Field of Classification Search
CPC ....... F05D 2260/30; F02K 9/34; F02K 9/343; F02K 9/52; F02K 9/60; F02K 9/605; F02K 9/62; F02K 9/68; F02K 9/97; B64G 1/22; B64G 1/24; B64G 1/26; B64G 1/40; B64G 1/401; B64G 1/405; B64G 1/406
See application file for complete search history.

(56) References Cited

U.S. PATENT DOCUMENTS 3,807,657 A * 4/1974 Brill ...................... B64G 1/401
244/1 R
4,069,664 A * 1/1978 Ellion ...................... F02K 9/68
422/607

(Continued)

FOREIGN PATENT DOCUMENTS

DE 43 10 821 A1 10/1994
GB 1470664 A * 4/1977

(Continued)

OTHER PUBLICATIONS

Gilmore "Spacecraft Thermal Control Handbook: Fundamental Technologies", vol. 1, 2002, The Aerospace Corporation, p. 75.*
(Continued)

*Primary Examiner* — Gerald L Sung
*Assistant Examiner* — William Breazeal
(74) *Attorney, Agent, or Firm* — Marshall, Gerstein & Borun LLP

(57) ABSTRACT

A thruster designed to produce thrust by introducing a propellant to a catalyst layer from a propellant valve via a propellant introduction member and spurting out a gas resulting from decomposition of the propellant occurring on the catalyst layer, wherein the thruster comprises a chamber of an Ni alloy for holding the catalyst layer inside, the propellant introduction member is made of an Ni alloy and connects the propellant valve and the chamber, and a propellant valve flange of a Ti alloy with a plurality of columns of a Ti alloy is arranged between the chamber and the propellant valve to support the chamber by the columns.

6 Claims, 3 Drawing Sheets

(51) Int. Cl.

| | | |
|---|---|---|
| *F02K 9/52* | (2006.01) | |
| *F02K 9/60* | (2006.01) | |
| *F02K 9/62* | (2006.01) | |
| *F02K 9/68* | (2006.01) | |
| *F02K 9/97* | (2006.01) | |
| *B64G 1/22* | (2006.01) | |
| *B64G 1/24* | (2006.01) | |
| *B64G 1/26* | (2006.01) | |
| *B64G 1/40* | (2006.01) | |
| *F02K 9/94* | (2006.01) | |

(52) U.S. Cl.
CPC . *F02K 9/605* (2013.01); *F02K 9/62* (2013.01); *F02K 9/68* (2013.01); *F02K 9/94* (2013.01); *F02K 9/97* (2013.01); *F05C 2201/0466* (2013.01); *F05D 2300/133* (2013.01)

(56) References Cited

U.S. PATENT DOCUMENTS

| | | | |
|---|---|---|---|
| 4,324,096 A | | 4/1982 | Ellion |
| 4,577,461 A | * | 3/1986 | Cann ............... B64G 1/406 219/121.49 |
| 5,568,723 A | * | 10/1996 | Burke ............... B01J 7/02 60/203.1 |
| 2002/0014070 A1 | * | 2/2002 | Stechman, Jr. ........ F02K 9/60 60/257 |
| 2007/0184971 A1 | | 8/2007 | Fokema et al. |

FOREIGN PATENT DOCUMENTS

| | | |
|---|---|---|
| JP | 55-160181 | 12/1980 |
| JP | 61-291752 | 12/1986 |
| JP | 03-018657 | 1/1991 |
| JP | 05-042343 | 2/1993 |
| JP | 6-41715 | 2/1994 |
| JP | 6-173774 | 6/1994 |
| JP | 11-132107 | 5/1999 |
| JP | 2004-92449 | 3/2004 |
| JP | 2004-195756 | 7/2004 |
| JP | 2009-257155 A | 11/2009 |
| WO | WO-2006/104004 A1 | 10/2006 |

OTHER PUBLICATIONS

Extended European Search Report for EP 13 15 8905, dated Apr. 2, 2015.

* cited by examiner

THRUSTER AND SPACECRAFT

BACKGROUND OF THE INVENTION

1. Field of the Invention

The present invention relates to a thruster which produces thrust by spurting out a gas produced by decomposition reaction of a propellant such as hydrazine and a spacecraft equipped with the thruster.

2. Description of the Related Art

Spacecraft such as artificial satellites and rockets are equipped with thrusters for controlling attitude and changing orbit in outer space. Monopropellant catalytic thrusters are a type of thrusters which supply a propellant such as hydrazine from a tank to a catalyst layer via a propellant valve and an injector to cause the propellant to decompose on the catalyst layer, and spurt out a gas resulting from the decomposition through a nozzle, thereby producing thrust.

The life of the thrusters for controlling attitude and orbit of the spacecraft is so crucial that it may possibly determine the life of the spacecraft itself. It is required that the thrusters be trouble-free and resistant to repeated use over a long period of time in special circumstances of the outer space.

With regard to thrusters of this type, a technology has been developed which prevents local degradation that the catalyst undergoes in the decomposition reaction when the propellant is supplied to the catalyst layer through an extra fine tube connected to the propellant valve, and improves the responsiveness and safety of the propellant valve (see JP 2009-257155 A, referred to as patent document 1).

The technology disclosed in patent document 1 can increase the life of the catalyst itself. The thrusters, however, generally have a problem that the catalyst layer reaches high temperature in the decomposition reaction, where heat is conducted from a chamber that holds the catalyst layer to the whole thruster, and to the structure of the spacecraft to which the thruster is attached.

For example, in a monopropellant thruster using hydrazine as a propellant and a catalyst layer formed of alumina particles coated with iridium which is a catalyst, the temperature of the propellant valve needs to be limited to about 120° C. while the catalyst layer reaches as high temperature as about 900° C.

To meet this requirement, the catalyst layer-holding chamber is made of a cobalt-nickel alloy resistant to high temperature, and a thermal-insulating structure is provided between the chamber and the propellant valve. However, the cobalt-nickel alloy does not have a high thermal insulating capability, and thus, it is difficult to reduce transfer of heat to the propellant valve and to the spacecraft structure. In addition, a heater is provided to preheat the catalyst layer and keep the propellant valve at appropriate temperature, where lower thermal insulation performance between the chamber and the propellant valve leads to greater power consumption of the heater.

SUMMARY OF THE INVENTION

The present invention has been made to solve the above problems. An object of the present invention is to provide a thruster and a spacecraft capable of reducing heat transfer from the catalyst layer to the propellant valve while keeping the catalyst layer at high temperature, and thus, reducing power consumption of the heater and preventing failures caused by exceeding the allowable limit of temperature.

An aspect of the present invention is directed to a thruster designed to produce thrust by introducing a propellant to a catalyst layer from a propellant valve via a propellant introduction member and spurting out a gas resulting from decomposition of the propellant occurring on the catalyst layer, wherein the thruster comprises a chamber of an Ni alloy for holding the catalyst layer inside, the propellant introduction member is made of an Ni alloy and connects the propellant valve and the chamber, and a propellant valve flange of a Ti alloy with a plurality of columns of a Ti alloy is arranged between the chamber and the propellant valve to support the chamber by the columns.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

With reference to the drawings attached, an embodiment of the present invention will be described below.

Figure 1:
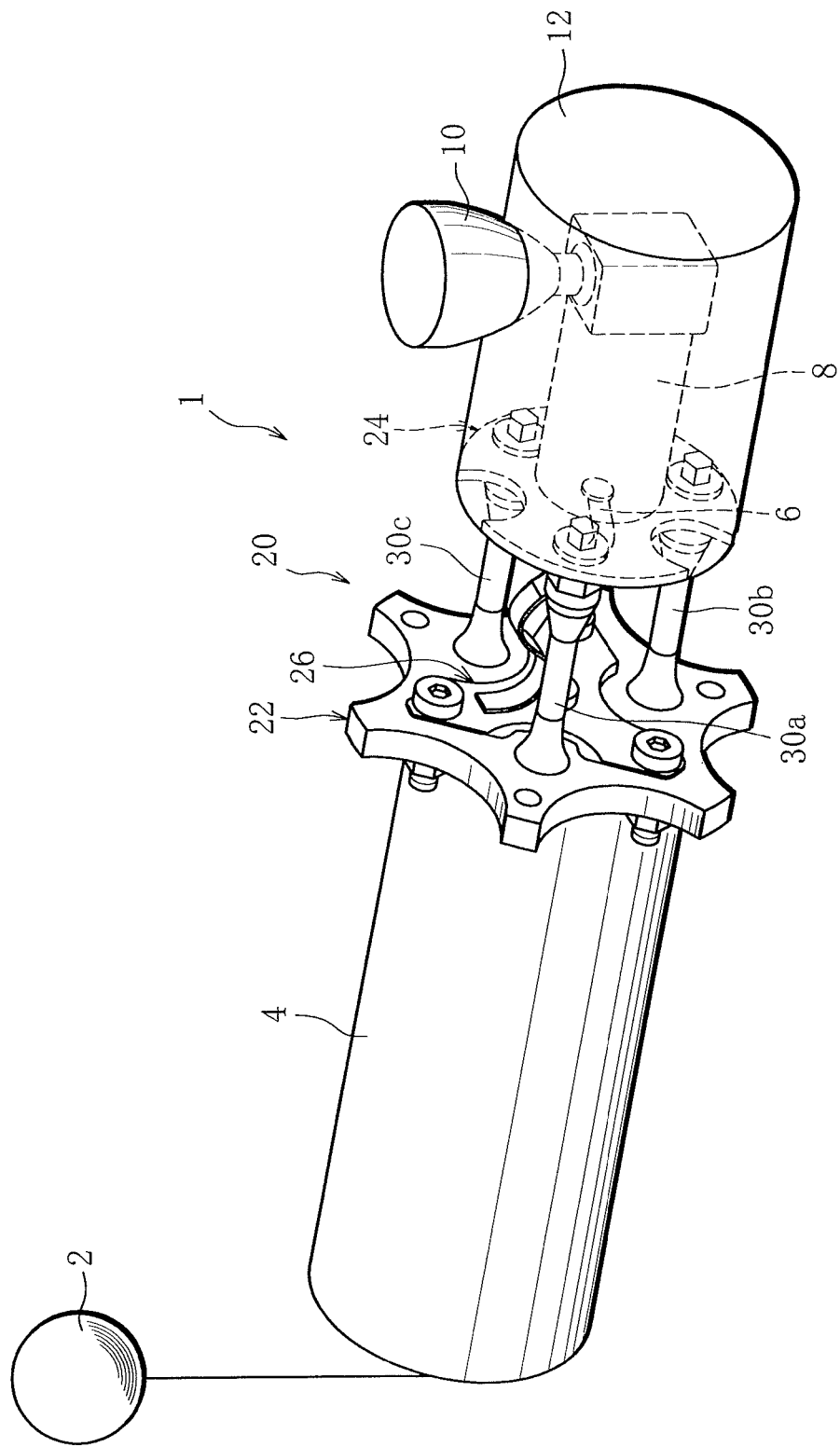
FIG. 1 is a perspective view showing the whole of an embodiment of a thruster according to the present invention.
Figure 2A:
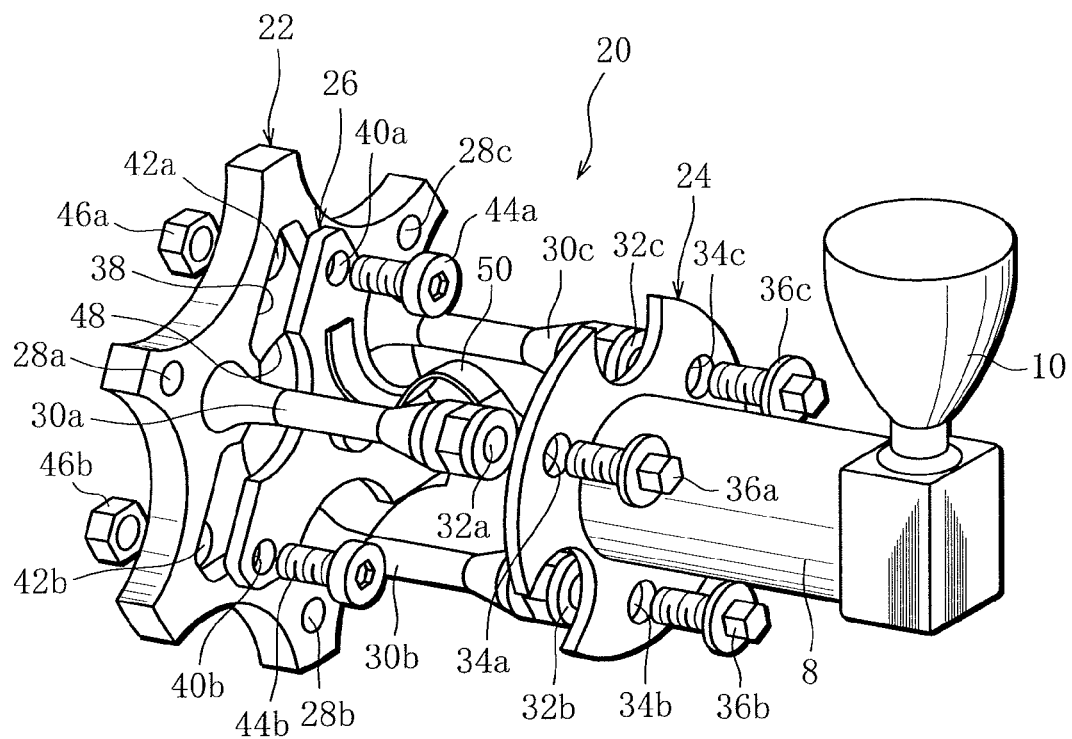
FIG. 2A is an enlarged exploded perspective view showing the embodiment of the thruster according to the present invention.
Figure 2B:
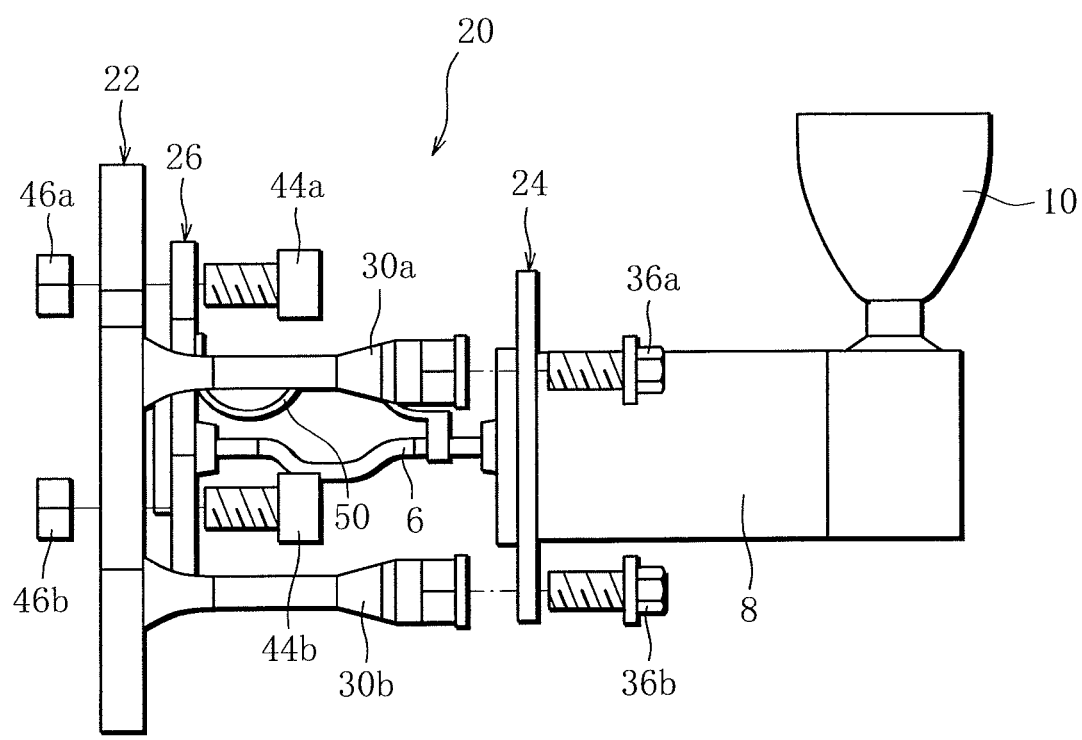
FIG. 2B is an enlarged exploded side view showing the embodiment of the thruster according to the present invention.

FIG. 1 is a perspective view showing the whole of an embodiment of a thruster according to the present, FIG. 2A an enlarged exploded perspective view of the thruster, and FIG. 2B an enlarged exploded side view of the thruster. The description below is based on these figures.

The thruster 1 shown in FIG. 1 is a monopropellant catalytic thruster. A plurality of thrusters of this type are mounted on a spacecraft for attitude control and orbit control.

The thruster 1 is configured such that hydrazine (propellant) is supplied from a tank 2 to a propellant valve 4. The propellant valve 4 is a solenoid valve with an exit port connected to an end of an introduction pipe 6 (propellant introduction member). The other end of the introduction pipe 6 forms an injector, which is connected to a chamber 8.

The chamber 8 holds a catalyst layer inside. Although not shown, the catalyst layer is formed, for example of alumina particles coated with iridium which is a catalyst, and held on mesh. The chamber 8 is cylindrical in shape, and has a nozzle 10 attached near the end remote from the injector. The nozzle 10 is oriented at right angles to the axis of the chamber 8. The chamber 8 is covered with a cover 12 with part of the nozzle 10 exposed.

The thruster 1 comprises a support structure 20 between the propellant valve 4 and the chamber 8. The support structure 20 comprises a propellant valve flange 22 to be attached to the propellant valve 4, a chamber flange 24 integrated with the chamber 8, and an introduction pipe flange 26 integrated with the introduction pipe 6 at the propellant valve-side end.

Next, the support structure 20 will be described in detail.

As seen in FIGS. 2A and 2B, the propellant valve flange 22 is approximately in the shape of a six-pointed star having a notch on each edge to reduce the weight, and attached to the exit-side end of the propellant valve. The propellant valve flange 22 has fitting holes 28a, 28b, 28c at locations near three of the six vertices of the six-pointed star, for use in fastening the propellant valve flange to the spacecraft by bolts and nuts, not shown. Further, the propellant valve flange 22 has columns 30a, 30b, 30c at inner locations with respect to the respective fitting holes 28a, 28b, 28c, the columns 30a, 30b, 30c extending toward the chamber 8. The columns 30a, 30b, 30c are welded to the propellant valve flange 22 at one end, and have a female thread 32a, 32b, 32c at the other, or distal end.

The chamber flange 24 is of a disk shape and integrated with the chamber 8 at the propellant valve-side end. The chamber flange 24 has three arc-shaped notches on the circumferential edge for heater sensors (not shown) to be arranged therein. The chamber flange 24 has three through-holes 34a, 34b, 34c at locations corresponding to the columns 30a, 30b, 30c. Male-threaded fasteners 36a, 36b, 36c are screwed into the columns with female threads 32a, 32b, 32c, through the through-holes 34a, 34b, 34c, respectively, so that the chamber flange 24 is supported by the columns 30a, 30b, 30c of the chamber valve flange 22.

The introduction pipe flange 26 is approximately in the shape of an equilateral triangle with an arc-shaped notch on each edge for reducing the weight. The propellant valve flange 22 has a recess 38 corresponding to the shape of the introduction pipe flange 26 to allow the introduction pipe flange 22 to be fitted therein when assembling the thruster. The introduction flange 26 and the recess 38 of the propellant valve flange have three pairs of through-holes 40a, 42a, 40b, 42b (one pair is not shown in the Figure) near their vertices. When assembling the thruster, the introduction flange 26 and the propellant valve flange 22 are together fixed to the propellant valve 4 by screwing bolts 44a, 44b into nuts 46a, 46b through the respective pairs of through-holes 40a, 42a, 40b, 42b. The recess 38 of the propellant valve flange 22 has an introduction hole 48 in the center to allow the propellant to flow to the introduction pipe 6 through it. An introduction pipe support plate 50 is attached to the introduction pipe flange 26 to support the introduction pipe 6. In the side view, the introduction pipe support plate 50 is undulating and joined to the introduction pipe 6 at the end remote from the introduction pipe flange, thereby supporting the introduction pipe 6.

According to the materials, the members constituting the support structure 20 are divided into two groups: those made of an Ni (nickel) alloy (Co—Ni alloy, for example) and those made of a Ti (titanium) alloy. Specifically, the chamber 8 holding the catalyst layer that can reach high temperature, the chamber flange 24, the fasteners 36a, 36b, 36c fastening the chamber flange 24 to the columns, the introduction pipe 6 conveying hydrazine to the catalyst layer, and the introduction pipe flange 26 are made of an Ni allow resistant to high temperature. The propellant valve flange 22 attached to the propellant valve 4 which needs to be kept at low temperature as compared with the catalyst layer, and the columns 30a, 30b, 30c are made of a Ti alloy having a low thermal conductivity, and thus, a high thermal insulating capability. The bolts 44a, 44b and nuts 46a, 46b for use in fastening the propellant valve flange 22 and the introduction pipe 6 together are made of stainless steel, for example.

In the thruster 1 constructed as described above, when the propellant valve 4 is opened, hydrazine is supplied from the tank 2 to the introduction pipe 6 and spurted out onto the catalyst layer in the chamber 8. On the catalyst layer, the propellant decomposes, and a gas resulting from the decomposition is spurted out through the nozzle 10 to produce thrust.

In the decomposition reaction, the catalyst layer reaches as high temperature as about 900° C., where heat is conducted from the catalyst-layer holding chamber 8 to the introduction pipe 6, the introduction pipe flange 26, the fasteners 36a, 36b, 37c and others. These members are, however, made of an Ni alloy, and thus, resistant to the conducted heat.

The columns 30a, 30b, 30c connected to the chamber 8, which are made of an Ti alloy and thus have a low thermal conductivity, can reduce heat conducted to the propellant valve flange 22 and the propellant valve 4. The columns 30a, 30b, 30c and the chamber flange 24 are made of different metal materials and thus difficult to weld together. In the present embodiment, however, the columns 30a, 30b, 30c and the chamber flange 24 are connected together by screwing the male-threaded fasteners 36a, 36b, 36c into the columns 30a, 30b, 30c with female threads 32a, 32b, 32c from the chamber flange 24 side to the column side, and thus, from the high temperature side to the low temperature side. If made of a Ti alloy, the fasteners may be damaged by thermal expansion and contraction. By contrast, screwing the male-threaded fasteners 36a, 36b, 36c of an Ni alloy resistant to high temperature into the columns 30a, 30b, 30c can provide a strong connection allowing a high temperature state.

The chamber 8 is supported only by the three columns 30a, 30b, 30c, which makes it possible to stably support the chamber 8 while minimizing the regions allowing conduction of heat to the propellant valve 4, thereby providing improved thermal insulation.

As described above, the support structure 20 is designed such that the catalyst layer-side members, which can reach high temperature, are made of an Ni alloy resistant to high temperature, the propellant valve 4-side members are made of a Ti alloy, considering the need to keep the propellant valve 4 at relatively low temperature, and the chamber 8 is supported by the three columns 30a, 30b, 30c. As a result, heat transfer from the catalyst layer to the propellant valve 4 is reduced to a desired level.

Reducing transfer of heat to the propellant valve 4 while allowing the catalyst layer to reach high temperature leads to a reduction in power consumed by a heater provided to preheat the catalytic layer and keep the propellant valve 4 at appropriate temperature. This also reduces transfer of heat to a spacecraft to which the thruster 1 is attached by the support structure 20. Consequently, failures caused by exceeding the allowable limit of temperature for the thruster 1 and the spacecraft are prevented.

In the above, an embodiment of the thruster and spacecraft according to the present invention has been described. The present invention is however not restricted to the described embodiment.

In the described embodiment, the support structure 20 is designed to support the chamber 8 by the three columns 30a, 30b, 30c. The number of columns is however not restricted to three; the chamber may be supported by four or more columns.

In the described embodiment, the propellant valve flange 22, the chamber flange 24 and the introduction pipe flange 26 are not restricted to the described shapes; they may be in any shape desired.

In the described embodiment, the nozzle 10 is oriented at right angles to the axis of the chamber 8. The nozzle 10 orientation is not restricted to this; it may be oriented in the direction of axis of the chamber 8, for example.

In the described embodiment, the propellant is hydrazine and the catalyst layer is formed of alumina particles coated with iridium. The propellant and the catalyst layer are however not restricted to these.

What is claimed is:

1. A thruster designed to produce thrust by introducing a propellant to a catalyst layer from a propellant valve via a propellant introduction member and spurting out a gas resulting from decomposition of the propellant occurring on the catalyst layer, wherein
- the thruster comprises a chamber of an Ni alloy for holding the catalyst layer inside,
- the propellant introduction member is made of an Ni alloy and connects the propellant valve and the chamber,
- an introduction pipe flange of an Ni alloy is integrated with an end of the propellant introduction member, and
- a propellant valve flange of a Ti alloy with a plurality of columns of a Ti alloy is arranged between the chamber and the propellant valve to support the chamber by the columns,
- wherein the propellant valve flange has a recess corresponding to a shape of the introduction pipe flange to allow the introduction pipe flange to be fitted in the recess when the thruster is assembled.

2. The thruster according to claim 1, wherein the columns are three in number.

3. The thruster according to claim 1, wherein the columns each have a female thread at a distal end to allow the columns and the chamber to be connected together by screwing male-threaded fasteners of an Ni alloy into the columns.

4. A spacecraft equipped with a thruster according to claim 1, wherein the thruster is attached to the spacecraft using the propellant valve flange.

5. The spacecraft according to claim 4, wherein the columns are three in number.

6. The spacecraft according to claim 4, wherein the columns each have a female thread at a distal end to allow the columns and the chamber to be connected together by screwing male-threaded fasteners of an Ni alloy into the columns.

\* \* \* \* \*